United States Patent [19]

Tennant

[11] Patent Number: 4,983,897
[45] Date of Patent: Jan. 8, 1991

[54] CONTROL CIRCUIT

[75] Inventor: James A. Tennant, Perrysville, Ohio

[73] Assignee: Therm-O-Disc, Incorporated, Mansfield, Ohio

[21] Appl. No.: 228,439

[22] Filed: Aug. 5, 1988

[51] Int. Cl.$^5$ .............................................. H02P 1/22
[52] U.S. Cl. ................................... 318/287; 318/286; 318/434; 388/903; 307/116; 361/27
[58] Field of Search ............ 307/9, 10 R, 10 B, 10 P, 307/117, 116; 318/280, 282, 283, 286, 287, 266, 256, 257, 331, 332, 333, 334, 338, 339, 341, 345 R, 345 C, 345 D, 345 F, 469; 388/903; 361/22, 23, 24, 25, 26, 27, 28, 29, 30, 31, 32, 33, 34

[56] References Cited

U.S. PATENT DOCUMENTS

| | | | |
|---|---|---|---|
| 3,225,280 | 12/1965 | Happe et al. | 361/27 X |
| 3,551,774 | 12/1970 | Rusch | 361/27 X |
| 3,693,047 | 9/1972 | Hamstra | 361/24 |
| 3,846,674 | 11/1974 | McNulty | 361/27 |
| 3,868,554 | 2/1975 | Konrad | 318/345 C X |
| 3,909,675 | 9/1975 | Hirsbrunner et al. | 361/27 |
| 3,949,284 | 4/1976 | Wright | 318/257 |
| 3,950,675 | 4/1976 | Weber et al. | 361/29 |
| 4,075,504 | 2/1978 | Gnaedinger | 307/10 BP X |
| 4,210,852 | 7/1980 | Gustavson | 318/432 X |
| 4,218,730 | 8/1980 | Marumoto et al. | 318/332 X |
| 4,379,986 | 4/1983 | Baxter et al. | 318/434 |
| 4,385,266 | 5/1983 | Sloan | 318/338 X |
| 4,412,158 | 10/1983 | Jefferson et al. | 318/284 X |
| 4,475,071 | 10/1984 | Yoshizawa | 318/334 |
| 4,562,387 | 12/1985 | Lehnhoff | 318/286 X |
| 4,678,975 | 7/1987 | Vrabel et al. | 318/266 |
| 4,710,685 | 12/1987 | Lehnhoff et al. | 318/287 |
| 4,751,603 | 6/1988 | Kwan | 307/116 X |

Primary Examiner—Paul Ip
Attorney, Agent, or Firm—Jones, Day, Reavis & Pogue

[57] ABSTRACT

A control circuit for connecting a load to a voltage source includes an electronic holding circuit having latched and unlatched states. When latched, the electronic holding circuit connects the load to the voltage source. A thermal device responsive to excessive current demand by the load automatically places the holding circuit in its unlatched state, and disconnects the load from the voltage source.

10 Claims, 2 Drawing Sheets

CONTROL CIRCUIT

BACKGROUND OF THE INVENTION

This application relates to the art of control circuits and, more particularly, to control circuits for automatically disconnecting a load from a voltage source when a predetermined condition is sensed. The invention is particularly applicable to use with electric motors and will be described with specific reference thereto However, it will be appreciated that the invention has broader aspects and can be used with other electrically operated devices.

It is common to provide automobiles with motor operated devices such as power windows, power antennas, power seats and power sun roofs. Control circuits for such motors commonly use mechanical current relays that are sensitive to vibration and voltage variations, and do not provide overload protection.

It would be desirable to provide a reliable control circuit having decreased sensitivity to vibration and voltage variations, while also providing overload protection.

SUMMARY OF THE INVENTION

In accordance with the present application, a PTC device performs the dual functions of providing overload protection and de-energizing a holding circuit.

The control circuit of the present application includes a holding circuit having latched and unlatched states for respectively connecting and disconnecting a voltage source and load. Manually operable means is provided for energizing the holding circuit to connect the voltage source and load through the holding circuit independent of the manually operable means. Thermal means responsive to excessive current flow to the load is provided for unlatching the holding circuit to disconnect the voltage source and load. The thermal means is also disconnected from the voltage source when the holding circuit is unlatched.

The improved circuit of the present application includes switch means for selectively reversing the direction of current flow to the load. The holding circuit is operative for supplying current to the load in one direction only.

The circuit preferably includes switch means for selectively connecting the voltage source and the load independently of the holding circuit and the manually operable means. This makes it possible to supply current to the load while bypassing the holding circuit.

In a preferred arrangement, the control circuit is for controlling a motor that is used to move a movable member having a limited degree of travel in opposite directions between limit positions. The thermal means is operative in response to an overload on the motor due to the movable member reaching one of its limit positions or due to the movable member encountering an obstacle intermediate its limit positions.

It is a principal object of the present invention to provide an improved control circuit for controlling a holding circuit that connects a voltage source to a load while also providing overload protection.

It is another object of the invention to provide such a control circuit that is inexpensive to manufacture and assemble, and that is reliable in operation.

DESCRIPTION OF PREFERRED EMBODIMENTS

Figure 1:
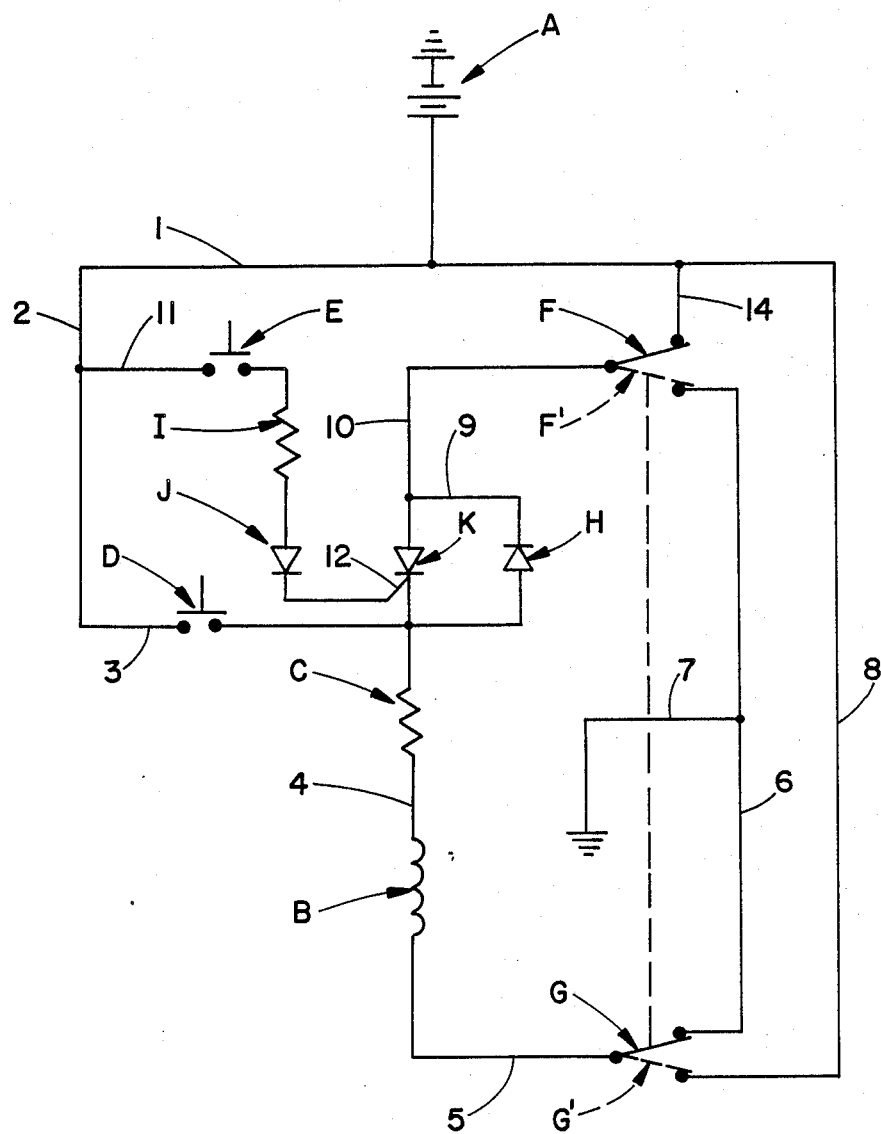
FIG. 1 shows one embodiment of a control circuit in accordance with the present application; and, FIG. 2 shows another embodiment of a control circuit in accordance with the present application.

Referring now to the drawing, wherein the showings are for purposes of illustrating certain preferred embodiments of the invention only, and not for purposes of limiting same, the Figures show control circuits for operating automobile power windows. The circuits include an automatic or express mode momentary switch that can be operated momentarily for energizing a holding circuit that operates the motor until a window reaches its lowermost position. The circuits also include normal down and normal up switches for selectively operating the motor to move the window up or down. Thermal means responsive to increased current demand by the motor unlatches the holding circuit and also provides overload protection.

With reference to FIG. 1, voltage source A is provided for selectively operating motor B. Thermal means C is connected in series with motor B and is operative responsive to excessive current demand by motor B for disconnecting same from voltage source A.

Although thermal means C can take many forms, it is preferably of the type having a positive temperature coefficient of resistance The material used for thermal means C can be a conductive polymer having a particulate conductive filler, such as carbon black. However, the material can also take other forms, including a doped ceramic, such as barium titanate. For purposes of this application, a thermal protector of the type described will be referred to as a PTC device or a PTC material. A PTC device exhibits a non-linear change in resistance with temperature. Within a certain narrow temperature range, the electrical resistance of a PTC device jumps sharply. A PTC device may be customized to respond to either temperature conditions of the surrounding environment or to current overload conditions. Also, the resistance and switching temperature of a PTC device can be varied by changing the composition of the PTC material, and by changing its geometry.

In a typical application, a PTC device is connected in series with the circuit components requiring protection. In the event of an overload in the system, the PTC device will reach switching temperature either by self-induced heating ($I^2R$) from the current passing through it or by sensing excessive ambient temperatures. At this point, the PTC device switches into its high resistance state, and effectively blocks the flow of current. A minimal amount of current will persist (trickle current), which holds the PTC device in its high resistance state. Once the power source has been interrupted, and the abnormal condition corrected, the PTC device will return to its rated conductive state, ready to protect the system once again.

Normal down switch D is selectively operable for operating motor B to move a window downwardly to any desired open position. Automatic or express down switch E is provided for automatically operating motor B to move a window completely down to its full open position. A pair of ganged switches F, G are normally biased to the solid line positions shown, and are selectively movable to the dotted line positions for operating motor B to move a window upwardly.

When normal down switch D is closed, current is supplied from voltage source A through lines 1, 2 and 3 to thermal means C and motor B in line 4. The circuit is completed through line 5, switch G, line 6 and line 7. Release of switch D disconnects motor B from voltage source A and stops the window in any desired position.

When it is desired to move the window upwardly, ganged switches F, G are moved to the F', G' positions. Current is then supplied from voltage source A through line 8, switch G' and line 5 to motor B and thermal means C in line 4. Current flow through motor B is reversed to operate same in a reverse direction for moving a window upwardly. From line 4, current flows through diode H in line 9 to line 10, switch F', and then through line 6 to line 7.

When the circuit of FIG. 1 is operated in the automatic or express down mode, switches F, G are in the normal solid line positions. Closing switch E provides current from voltage source A through lines 1, 2 and 11, and through a current limiting resistor I and a diode J to gate 12 of an SCR K. This gates SCR K on so that current flows therethrough from voltage source A through line 1, line 14, switch F and line 10. Switch E can be released as soon as SCR K is gated on because the current flowing through SCR K will maintain it conductive. When the window reaches its full down position, motor B will stall and cause a significantly greater current flow. This will cause thermal means C to switch to its high resistance state for effectively cutting off current flow to motor B. At the same time that thermal means C switches to its high resistance state, the current flow through SCR K will no longer be sufficient to maintain SCR K conductive Therefore, the circuit will be de-activated until one of the switches is again operated.

Figure 2:
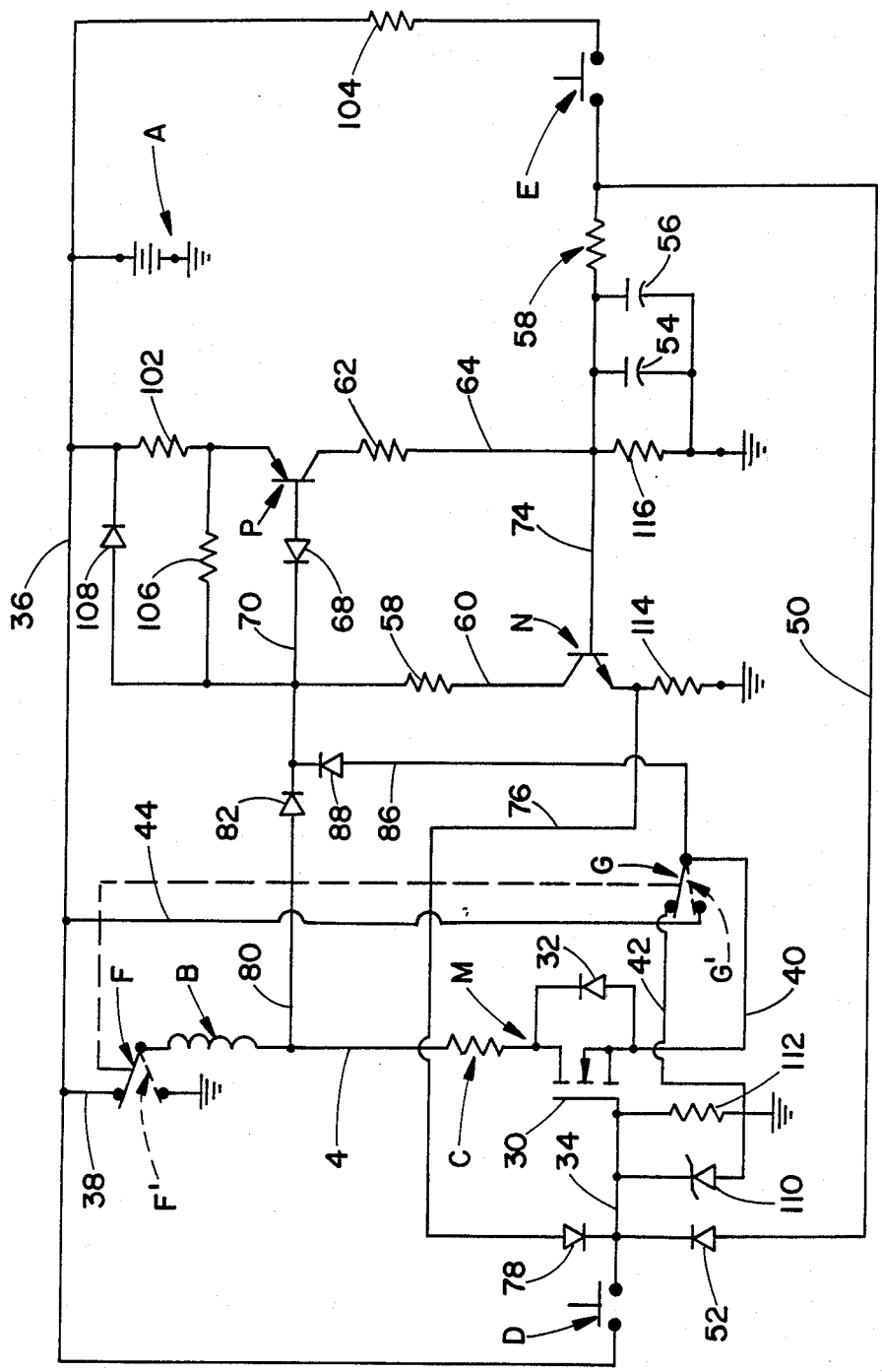

FIG. 2 shows a circuit that includes MOSFET connected in series with motor B and thermal means C. MOSFET M has a gate 30, and a diode 32 is internal to the MOSFET.

Closing normal down switch D provides a biasing voltage through line 34 to MOSFET gate 30 for turning the MOSFET on. Current then flows from voltage source A through lines 36, 38 and switch F to motor B and thermal means C in line 4. Current flows through MOSFET M to line 40, switch G and line 42. Releasing normal down switch D will stop the motor because the absence of a biasing voltage on MOSFET gate 30 will turn the MOSFET off.

For operating motor B in the reverse direction and moving a window upwardly, switches F, G are moved from their normal solid line positions to their dotted line positions F', G'. Current is then supplied from voltage source A through line 36, line 44, switch G', line 40, internal MOSFET diode 32, line 4 and switch F'. Releasing switches F, G will return same to their solid line positions and stop motor B with the window in any desired raised position.

In the event the window encounters an obstruction or reaches its full up or down positions while switches D or F, G remain depressed, the motor will demand a higher current which will be sensed by thermal means C for interrupting current flow to motor B.

Motor B can be operated for moving the window to its full down position by momentarily closing automatic or express down switch E. Closing of switch E provides a biasing voltage on the MOSFET gate 30 through line 50, diode 52 and line 34 for turning MOSFET M on. Momentary closing of switch E also charges capacitors 54, 56 through resistor 58. When capacitors 54, 56 are charged to a predetermined voltage, NPN transistor N will be biased on. This in turn will provide a forward bias on PNP transistor P for turning same on. Resistor 58 in line 60 provides a proper voltage drop to the emitter of transistor P so that when transistor N is turned on a forward bias will be provided for transistor P. Resistor 62 in line 64 is a current limiting resistor.

Transistors N, P are part of a holding circuit and diode 68 in line 70 isolates such holding circuit from the motor circuit. Once transistors N, P are turned on and switch E is opened, current flowing through transistor P and line 64 will maintain transistor N conductive through line 74. Current flows from transistor N through line 76 and diode 78 to line 34 for maintaining a biasing voltage on MOSFET gate 30. Current then flows through motor B, thermal means C and MOSFET M in the same manner as explained for closing of normal down switch D.

With express down switch E released and transistors N, P remaining conductive, motor B will operate until the window is completely down. At that point, the motor will demand higher current which will cause thermal means C to switch to its high resistance state This will provide a reverse bias through line 80, diode 82 and line 70 for turning transistor P off. This also results in transistor N being turned off and removing the biasing signal from MOSFET gate 30. The entire circuit will then remain off until one of the switches is again operated.

If up switches F', G' are operated while the circuit is in the express down mode, a reverse bias on transistor P will be provided through line 44, switch G', line 86, diode 88 and line 70 for turning same off. This will unlatch the holding circuit.

Resistors 102, 104 are current limiting resistors. Resistor 106 is a degenerative feedback resistor to transistor P that makes the holding circuit less sensitive to noise Diode 108 is a dynamic breaking diode that is connected across the motor only in the up mode, and shorts the motor to itself when the up switches F', G' are released for return to their normal positions F, G while the window is moving upwardly. This provides a dynamic stop for the motor. Zener diode 110 and resistor 112 near MOSFET gate 30 absorb transient currents and voltages for protecting the MOSFET gate against spikes Resistors 114, 116 provide a desired voltage drop. When transistor P is turned off, capacitors 54, 56 discharge and turn transistor N off.

In the arrangements shown and described, SCR K of FIG. 1, and transistors N, P of FIG. 2, define electronic means having energized and de-energized states for respectively connecting and disconnecting the voltage source and the load defined by the motor. These electronic means also define a holding circuit having latched and unlatched states for connecting and disconnecting the motor from the voltage source. Express down switch E defines manually operable means for energizing the electronic means or holding circuit to connect the voltage source and motor through the electronic means or holding circuit independent of switch E. Thermal means C is responsive to excessive current flow to the load defined by motor B for de-energizing or unlatching the electronic means or holding circuit for disconnecting the motor from the voltage source. Thermal means C is also disconnected from the voltage source when the electronic means or holding circuit is de-energized Switches F, G define switch means for selectively reversing the direction of current flow to the load defined by motor B. The electronic means or holding circuit provides current to the motor in only one direction.

Normal down switch D defines switch means for selectively connecting the voltage source and load independently of manually operable means E and electronic means K of FIG. 1, or N, P of FIG. 2

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A control circuit for connecting a voltage source to a load and comprising:
   an electronic switch coupling said voltage source in a path to said load, said switch having a conducting and a non-conducting state,
   means coupled to said switch to hold said switch in said conducting state,
   thermal means in series with the said switch and said load to cause a decrease of current flow in said path when said load increases a predetermined amount, and
   means coupled to said thermal means and said switch holding means for causing said switch to assume the nonconducting state when said thermal means causes said decrease of current flow thereby disconnecting said load from said voltage source.

2. The circuit of claim 1 wherein said thermal means comprises a PTC device.

3. A control circuit as in claim 1 further including switch means for selectively connecting or disconnecting said load from said voltage source independent of said electronic switch.

4. The circuit of claim 3 wherein said switch means is also for selectively reversing the direction of current flow to said load.

5. The circuit of claim 3 wherein said switch holding means comprises electronic latching means having latched and unlatched states for respectively connecting or disconnecting said voltage source and load, said latching means being operative in said latched state for maintaining said voltage source and load connected independently of said switch means and in the absence of any continuous manual input to said switch means or said manually operable means, and said latching means being movable to said unlatched state by said thermal means.

6. A control circuit for selectively connecting a voltage source to a motor for controlling movement of a movable member in opposite directions between limit positions, said circuit comprising:
   switch means for selectively moving said movable member in either of said opposite directions,
   electronic means having energized and de-energized states for respectively connecting or disconnecting said voltage source and said load;
   said electronic means having a first conducting state with a first predetermined level of current flow, and a second non-conducting state when said current flow decreases to a second predetermined level;
   manually operable means for placing said electronic means in said energized state, said electronic means being operative in said energized state to operate said motor for automatically moving said movable member to one of said limit positions; and
   thermal means in series with said electronic means and said motor to cause a decrease in current flow to said second predetermined level when said movable member reaches said one limit position so as to cause said electronic means to become nonconductive and disconnect said voltage source from said motor.

7. The circuit of claim 6 wherein said thermal means comprises a PTC device.

8. A control circuit for energizing a motor to move a movable member to a limit position and then automatically de-energize the motor, said circuit comprising:
   electronic means having energized and de-energized states for respectively energizing and de-energizing said motor; said electronic means having a conducting and a non-conducting state;
   manually operable means for placing said electronic means in said conducting state;
   means coupled to said electronic means to hold said electronic means in said conducting state;
   thermal means in series with said electronic means and said motor to cause a decrease of current flow to said motor when said movable member reaches said limit position; and
   means coupled to said thermal means and said electronic holding means for causing said electronic means to assume the non-conducting state when said thermal means causes said decrease of current flow thereby disconnecting said motor from said voltage source.

9. A control circuit for connecting a voltage source to a reversible motor for moving a movable member having a limited degree of travel in opposite directions between limit positions;
   switch means for selectively reversing the direction of current flow to said motor;
   an electronic switch coupling said voltage source in a path to said motor, said electronic switch having a first conducting state with a first predetermined level of current flow in said path and a second non-conducting state when said current flow decreases to a second predetermined level; and
   thermal means in a series with said electronic switch and said motor for decreasing current flow in said path to said second predetermined level and thereby placing said electronic switch in said non-conducting state to disconnect said voltage source from said motor when the load on said motor increases a predetermined amount due to said movable member reaching one of said limit positions or due to said movable member encountering an obstacle intermediate said limit positions.

10. A control circuit for connecting a voltage source to a load and comprising;
    an electronic switch coupling said voltage source in a path to said load, said electronic switch having a first conducting state with a first predetermined level of current flow in said path and a second non-conducting state when said current flow decreases to a second predetermined level;

thermal means in series with said switch and said load for decreasing current flow in said path to said second predetermined level to thereby place said electronic switch in said non-conducting state to disconnect said voltage source from said load when said load increases a predetermined amount;

manually operable means for causing said electronic switch to assume the first conducting state at said first predetermined level of current flow; and switch means for selectively connecting said voltage source and said load independently of said manually operable means and said electronic switch.

* * * * *